(12) United States Patent
Innerlohinger et al.

(10) Patent No.: US 9,163,095 B2
(45) Date of Patent: Oct. 20, 2015

(54) CELLULOSE POWDER AND PROCESSES FOR ITS PRODUCTION

(75) Inventors: Josef Innerlohinger, Berg i.A. (AT); Gregor Kraft, Timelkam (AT); Hedda Weber, Vöcklabruck (AT); Haio Harms, Gmunden (AT)

(73) Assignee: Lenzing Aktiengesellschaft, Lenzing (AT)

( * ) Notice: Subject to any disclaimer, the term of this patent is extended or adjusted under 35 U.S.C. 154(b) by 1046 days.

(21) Appl. No.: 12/679,212

(22) PCT Filed: Sep. 12, 2008

(86) PCT No.: PCT/AT2008/000324
§ 371 (c)(1),
(2), (4) Date: Sep. 14, 2010

(87) PCT Pub. No.: WO2009/036480
PCT Pub. Date: Mar. 26, 2009

(65) Prior Publication Data
US 2011/0009259 A1    Jan. 13, 2011

(30) Foreign Application Priority Data

Sep. 21, 2007    (AT) ................. A 1498/2007

(51) Int. Cl.
*C08L 1/02* (2006.01)
*C08J 3/12* (2006.01)
(Continued)

(52) U.S. Cl.
CPC .................. *C08B 16/00* (2013.01); *C08B 1/003* (2013.01); *C08J 3/12* (2013.01); *C08L 1/02* (2013.01); *C08J 2301/02* (2013.01); *Y10T 428/2982* (2015.01)

(58) Field of Classification Search
CPC .......... C08B 1/11; C08B 1/003; C08B 16/00; C08L 1/00; C08L 1/04; C08L 1/02; C08L 2201/54; C08J 3/00; C08J 3/005; C08J 3/12; C08J 3/124; C08J 3/14; C08J 3/16; C08J 2301/02; B01J 20/26; B01J 20/22; B01J 20/3021; B01J 20/3028; B01J 20/3071; B01J 20/305; B01J 20/3078; B01J 2220/48; B01J 2220/4825

See application file for complete search history.

(56) References Cited

U.S. PATENT DOCUMENTS 4,415,124 A    11/1983    Carduck et al. ................. 244/28
4,659,494 A    4/1987    Soldanski et al. ............... 8/142
(Continued)

FOREIGN PATENT DOCUMENTS

DE    197 55 353 C1    4/1999
DE    102 21 537 A1    11/2003
(Continued)

OTHER PUBLICATIONS

O. Schmidt, "Washing Filtration of Wine: with Kieselgur or cellulose", The German Wine Magazine, pp. 29-35 (2004)—(Non-English Copy).
(Continued)

*Primary Examiner* — Katherine Zalasky
(74) *Attorney, Agent, or Firm* — Fitzpatrick, Cella, Harper & Scinto

(57) ABSTRACT

The invention relates to a process for producing spherical, non-fibrillar cellulose particles with a particle size in the range of from about 1 μm to about 400 μm from a solution of cellulose in which the solution is cooled down to below its solidification temperature wherein it is flowing freely, the solvent is washed out, the solidified cellulose solution is disintegrated to form cellulose powder comprising particles, and the disintegrated and washed out particles are dried. The invention also relates to the cellulose powder and particles made in accordance with the process of the invention.

14 Claims, 3 Drawing Sheets

(51) Int. Cl.
    *C08J 3/14*     (2006.01)
    *B01J 20/30*     (2006.01)
    *C08B 16/00*     (2006.01)
    *C08B 1/00*     (2006.01)
    *B01J 20/26*     (2006.01)
    *B01J 20/22*     (2006.01)

(56) References Cited

U.S. PATENT DOCUMENTS

| | | | | |
|---|---|---|---|---|
| 4,902,792 | A | 2/1990 | Okuma et al. | 536/57 |
| 5,026,841 | A | 6/1991 | Francotte et al. | 536/58 |
| 5,196,257 | A | 3/1993 | Barraud et al. | 428/220 |
| 5,244,734 | A | 9/1993 | Okuma et al. | 428/402 |
| 6,174,358 | B1 | 1/2001 | Oberkofler et al. | 106/200.1 |
| 6,670,469 | B1 | 12/2003 | Beyer et al. | 536/56 |
| 6,919,029 | B2 | 7/2005 | Meng et al. | 210/665 |
| 2002/0061335 | A1* | 5/2002 | Kumar | 424/488 |
| 2004/0033266 | A1* | 2/2004 | Thassu | 424/489 |
| 2005/0225013 | A1 | 10/2005 | Schulze et al. | 264/621 |
| 2005/0287208 | A1* | 12/2005 | Kumar et al. | 424/464 |

FOREIGN PATENT DOCUMENTS

| | | |
|---|---|---|
| EP | 0 356 419 A2 | 2/1990 |
| EP | 1 693 402 A2 | 8/2006 |
| JP | 63092603 A | 4/1988 |
| JP | 2006-028452 A | 2/2006 |
| KR | 950000687 B1 | 1/1995 |
| WO | WO 93/13937 A1 | 7/1993 |
| WO | WO 99/31141 A2 | 6/1999 |
| WO | WO 99/36604 A1 | 7/1999 |
| WO | WO 02/00771 A1 | 1/2002 |
| WO | WO 02/057319 A2 | 7/2002 |
| WO | WO 2006/034837 A2 | 4/2006 |
| WO | WO 2007/003697 A1 | 1/2007 |
| WO | WO 2007/003699 A1 | 1/2007 |

OTHER PUBLICATIONS

T. Röder et al., "Crystallinity Determination of Man-Made Cellulose Fibers—Comparison of Analytical Methods," Lenzinger Berichte, vol. 86, pp. 132-136 (2006).

* cited by examiner

CELLULOSE POWDER AND PROCESSES FOR ITS PRODUCTION

BACKGROUND OF THE INVENTION

1. Field of the Invention

The present invention relates to a cellulose powder of spherical, non-fibrillar cellulose particles and a process for the production of this.

2. Description of Related Art

The applications for cellulose powder are diverse and range from the pharmaceutical sector to the construction industry. Cellulose powders can be found in the laboratory as a chromatography column filler as well as in large-scale technical processes as auxiliary filter materials. In the food stuff and cosmetics industry they are widely used as auxiliary and carrier substances. In general a trend is noticeable that there are attempts to replace inorganic powders (e.g. of silica) with cellulose powders (O. Schmidt, "washing filtration of wine: with kieselgur or cellulose", The German Wine Magazine, pp. 29-35, 2004).

Cellulose powders are mainly obtained by preparing and grinding pulp or even wood and annual plants. As a result of an additional hydrolysis step, so-called microcrystalline cellulose (MCC) can be obtained. FIG. 1 shows the production of cellulose powders out of cellulose in diagram form in accordance with the state of the art.

Depending on the complexity of production, powders of different qualities (purity, size, etc.) are obtained. What all these powders have in common is that they reveal a fibrous structure since natural cellulose has a pronounced tendency in any order of magnitude to form fibrous structures like this. Likewise MCC, which is also described as spherical, is consisting of crystalline fiber fractions.

Depending on their microstructure, structure types of the cellulose can be differentiated, in particular cellulose-I and cellulose-II. The differences between these structural types can be determined by radiography and they are described in detail in the scientific literature.

All of the powders described above are consisting of cellulose I. There are a large number of patents for the production and application of cellulose-I-powders. Numerous technical details are also patented in these e.g. with regard to grinding. As described above, cellulose-I-powders are of a fibrous nature which is a hindrance for a number of applications. Thus, for example, suspensions of powders of this kind have a viscosity which depends to a considerable extent on the shear strain. In the same way fibrous powders often display a limited pourability since the fibers can get caught up.

Cellulose powders on the basis of cellulose-II can be found on the market. Cellulose powders with this structure can either be obtained from a solution (mostly viscose) or via the disintegration of cellulose-II-powders (e.g. cellophane). In the same way very fine powders are procurable but only in small quantities (10 μm and less).

U.S. Pat. No. 5,244,734 describes the production of spherical particles with diameters of lower than 20 μm from a viscose dispersion.

WO 99/36604 describes fibrous particles which are obtained from the regeneration of viscose with the highest possible shear strain. For example a stream of 500 ml/min of a diluted viscose solution with a cellulose concentration of 1 to 4 weight percentage is led through a 3 mm nozzle into a stirred precipitation bath. This results in fibrous, fibrillar particles due to the high shear strain and the low cellulose concentration.

WO 2007/003699 describes the production of cellulose particles as a result of the regeneration of a cellulose solution in an acid (e.g. by spraying or mixing) with a particle size of preferably 0.05-10 μm. The production of cellulose solution is performed by the enzymatic treatment of the pulp followed by a reaction with an alkali. The cellulose particles are used as a filling material and coating pigment for paper since they are light and eco-compatible, as a cellulosic powder for the food stuff industry as well as for the pharmaceutical industry. One variant described is the modification of cellulose before or after regeneration e.g. via acetylation and the increase in porosity by adding substances which dissolve in these regeneration conditions.

WO 2007/003697 describes the coating of cellulose particles (0.05-10 μm) with substances which disperse light (e.g. silicates, titanium oxide). These particles are likewise used as a filling material and may be useful as a coating pigment for paper and carton.

According to WO 2006/034837, cellulose particles with a length of preferably 50 μm and a thickness of 1 μm are produced in water by exerting shear forces on a suspension of a starting product containing cellulose. These are to be used as a ceramic aggregate for paper, carton and coating colors to increase the tenacity, improve the print image, increase the color intensity and as a carrier material for other substances. These cellulose particles are fibrous and/or fibrillar.

The production of cellulosic micro particles for cosmetic applications via the incorporation of powder-like substances in viscose can be found in JP 63092603. In this respect a dispersion is formed of viscose, inorganic filling material and a water-soluble anionic, high molecular weight substance. The coagulation is, for example, produced by heating. There are no precise details about the size of the cellulose particles obtained.

WO 93/13937 describes the production of cellulose balls with a diameter of preferably lower than 25 μm with a dense surface which reveals no pores, scratches or anything similar: first of all an emulsion is made of viscose in oil. The coagulation takes place for example in water-free, alcoholic salt solutions. Finally washing takes place with concentrated salt solutions containing alcohol to prevent swelling and then this is regenerated with acid solutions containing alcohol. The particles produced in this way are applied in chromatography particularly as carrier materials, so-called carriers for ligands (enzymes, antibodies, peptides, proteins). Due to the dense surface of the ball-shaped cellulose particles, no interfering diffusion processes occur.

In U.S. Pat. No. 5,196,527 the production of porous, ion-exchanging, ball-shaped, e.g., oval, cellulose particles with a size of 3-400 μm is described using the following steps: first of all coagulated viscose particles are made by forming a dispersion which contains cellulose xanthate and finally coagulating the viscose parts as a result of heating or with the help of a coagulation reagent. These viscose parts are regenerated by an acid or via a crosslinking followed by regeneration. As a result of the crosslinking, a high pressure resistance is attained in the particles. In a final step, ion-exchanging groups are introduced to the cellulose molecule. These cellulose particles have a cellulose-II-structure and an x-ray crystallinity of 5-50%, and preferably 20-40%.

These particles are also used in chromatography as well as for cleaning and separating different substances. If the cellulose particles are to be used as carriers, then certain ligands are introduced instead of ion-exchanging groups e.g., antibodies to separate antigens and/or peptides to separate enzymes.

U.S. Pat. No. 5,026,841 deals with the production of porous, ball-shaped cellulose particles with a preferred particle size of 5-80 μm. To this end a cellulose ester of an aromatic carboxylic acid, which is dissolved in an organic solvent, is introduced to an aqueous solution of an anionic tenside while stirring vigorously, the organic solvent is removed, the parts are isolated and finally the carboxylic acid groups are separated. These particles are used as filling materials, carriers for filtration, cleaning, adsorption, carriers, to set inorganic or organic materials as well as in the form of carriers for enzyme and for protein immobilization and cleaning.

KR 950000687 describes the production of a cellulose powder (1-20 μm) for cosmetic products of Ramie fiber according to the following process: Treatment with alkaline hypochlorite solution, washing, dispersing in water and finally spray drying.

JP 2006028452 describes the production of a cellulose solution as a pouring aid for powder-shaped food stuffs e.g., common salt, whereby 50% of the parts possess a particle size of between 1-50 μm.

According to U.S. Pat. No. 4,415,124, a micro powder of cellulose is produced by reinforcing/condensing, followed by grinding (at least 90% of the parts with a particle size of lower than 125 μm). The particles received are used as an additive for mortar, plaster masses, wallpaper paste, filling material for molding mass and plastics as well as in the form of carrier materials in the pharmaceutical industry.

EP 1693402 describes, among other things, the production of a cellulosic body with a preferred size of 1 μm-5 mm, preferably 10 μm-500 μm of porous cellulosic parts (also regenerated). In one variant, cellulosic parts are distributed in an alkaline medium which contains a binder (e.g., water-glass). The suspension is converted in droplet form and finally coagulated in a corresponding coagulation solution whereby the cellulose particles join so that intermediate spaces are left. These particles are used as carriers to mobilize enzymes, as carriers or a matrix for adsorption or as cosmetic additives. The advantages are the high mechanical resistance and the high throughput rates which are possible.

U.S. Pat. No. 4,659,494 describes the production of a powder to clean carpets which contains cellulose powder with a particle size of preferably 5-50 μm as an adsorption agent. No more details are given of the production of the cellulose powder but it would appear to be obtains as a result of disintegrating pulp.

Viscose processes which proceed via the intermediate stage of cellulose xanthate are not desirable nowadays due to the manifold environmental burdens, among other things, with sulphurous waste gases which require complex waste gas purification in their production.

Starting from viscose technology WO 02/00771 and U.S. Pat. No. 6,174,358 utilize NMMO as an alternative solvent for the production of cellulose particles. However, both patents deal with fibrillar and not spherical particles.

According to WO 02/00771 cellulose particles are made by dispersing a cellulose solution (of cellulose or cellulose derivatives, solvent acetone, N-methylmorpholine-N-oxide, aqueous caustic lye of soda, etc.) in a precipitation medium. Additives such as cationization agents or filling materials may also be contained in the solution. Dispersing is done via the shear stress produced with the help of a refiner.

DE 19755353 describes a similar method whereby a solution of cellulose in NMMO is formed to a jet which is divided into individual segments by means of rotating cutting beams. The solution parts are intercepted in a dispersion medium. The pearl-shaped cellulose parts are then received by cooling down the dispersion or by precipitating with a precipitation agent. The process is used to produce porous pearl celluloses with a particle size of 50-1000 μm which are used as separation and carrier materials for medical and diagnostic purposes, as adsorber materials e.g., for blood detoxification and as cell culture carriers.

DE 10221537 describes the production of hybridic molded bodies with a size of 1-1000 μm in which polysaccharide solutions containing additives are dispersed in an inert solvent so that solvent drops form. This is preferably cellulose dissolved in N-methyl morpholine-N-oxide-monohydrate. The additives are for example ceramic powders. Finally the dispersion developed from this is cooled down whereby the solvent drops solidify. These are separated off and introduced to a precipitating medium. Drying then takes place and/or a thermal treatment.

WO 02/57319 describes the production of cellulose pearls using the NMMO process whereby different additives in large quantities are added to the cellulose solution prior to forming, for example titanium oxide or barium sulphate and materials acting as ion exchangers. The products obtained can be used as ion exchangers or catalysts.

The production of a titanium oxide suitable as an ion exchanger for example for waste water purification is described in U.S. Pat. No. 6,919,029. Particularly high absorption capacities and speeds are achieved with this material since the titanium oxide material is activated via a special treatment on the surface. This titanium oxide material can be described as a "substoichiometric titanium oxide". This means that the ratio of the oxygen atoms to the titanium atoms in the material is smaller than 2. Reference is made to the description in U.S. Pat. No. 6,919,029 for a more detailed description of this surface activation.

Other possibilities to produce titanium oxides which are particularly well suited to waste water treatment, are in the so-called "doping" of titanium oxide with iron and sulphur atoms. These substances have a photocatalytic activity.

All of these processes have the disadvantage that an orientation of the cellulose molecules develops in the resulting particles when exposing the cellulose solution to only very slight shear forces which, following complete coagulation or regeneration, leads to a fibrillar, i.e., fibrous particle structure. The demand for spherical instead of fibrillar powders is, however, constantly on the increase since fibrillar powders reveal various disadvantages. Thus fibrillar powders are not suitable for some applications (e.g., viscosity modifiers) because they change the flow behavior of the liquid, to which they are added, so that it is dependent on the shear strain, i.e. in the direction of non-Newtonian behavior. This is not desirable with printing inks, for example. Moreover, spherical cellulose powders flow more readily and can be more easily conveyed, dosed and dispersed. This plays an important role particularly with applications in the pharmaceutical, cosmetics and foodstuff industry and when replacing silica gel and other inorganic substances. However, these particles must have a sufficient absorption capacity for the different substances despite the non-fibrillar structure e.g., pharmaceutical active agents, aromas, oily and fatty substances.

SUMMARY OF THE INVENTION

The present invention is directed to an economical and eco-friendly process available for the production of spherical, i.e., non-fibrillar cellulose particles.

The invention also relates to non-fibrillar cellulose particles with enhanced properties and an improved processing and characterization ability available.

The invention further relates to a process for producing spherical, non-fibrillar cellulose particles with a particle size in the range of from about 1 µm to about 400 µm from a solution of preferably non-derivatized cellulose which is preferably in a blend of an organic substance and water the process comprising: cooling down the solution to below its solidification temperature wherein the solution is flowing freely, washing out the solvent, disintegrating the solidified cellulose solution to obtain cellulose powder comprising particles, and drying the disintegrated and washed out particles. After disintegrating and before drying, the solvent may again be washed out.

DETAILED DESCRIPTION OF THE INVENTION

To describe the present invention the term "spherical" is to be understood as follows: the particles have an axial ratio (1:d) between 1 and 2.5 and under the microscope they reveal no fiber-like fringes or fibrils.

The term "fibrillar" should by contrast be understood as follows: the particles possess an axial ratio (1:d) of more than 2.5 and/or under the microscope they reveal fringes and fibrillation typical for fibers.

In the process according to the invention, the disintegration is performed preferably using a mill.

The production of a suitable cellulose solution is well-known. For the continuous production of spinnable cellulose solutions, a thin film evaporator (filmtruder), such as for example, in EP 0356419 B1 is described, can be used. The organic substance in the solvent can be an amine oxide, preferably N-methylmorpholine-N-oxide (NMMO). Preferably NMMO solutions with a cellulose concentration of from about 1% to about 14% are produced. So-called ionic liquids are known as other possible solvents which can principally be made and processed using the same apparatus and using the same process (e.g., WO 03/029329, WO 06/108861). In ionic liquids the suitable cellulose concentration can be higher and be between from about 1% and about 30%.

Figure 1:
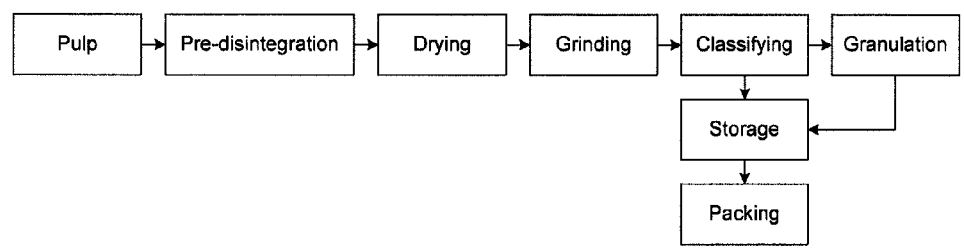
FIG. 1 is a flow diagram showing processes for the production of cellulose powders from cellulose in accordance with prior art processes.
Figure 2:
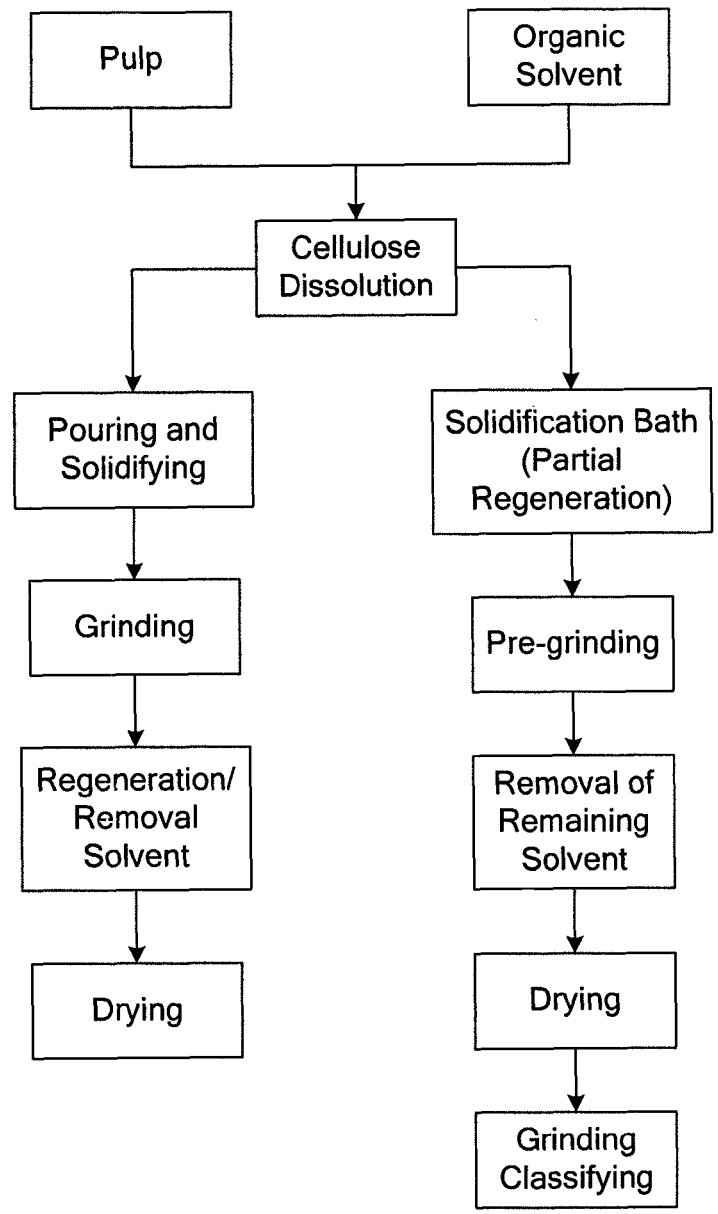
FIG. 2 is a flow diagram showing two exemplary processes for the production of cellulose powders from cellulose in accordance with the present invention.

When performing the process and producing the cellulose powder according to the invention, care should be taken that the solution is cooled down to below the solidification temperature wherein the solution is flowing freely. "Flowing freely" means that no shear force occurs between the emergence from the extrusion opening and the point of solidification, i.e., the place where the solution is at least partly solidified and that no considerable stretching or shear strain takes place. In this way the formation of fibrous structures can be prevented. This can for example be achieved via the two exemplary process variants described below and depicted in the flow diagram of FIG. 2.

1) Cooling down is performed by introducing the solution to a liquid via a correspondingly large opening, i.e., in the form of a cable which is preferably as thick as possible, with a low flow speed, to a cooling bath which, for example, contains a liquid such as water, alcohol, a salt solution, or a blend of water and the solvent used to dissolve the cellulose. The solution solidifies and the solvent is thus washed out in part. In a preferred embodiment, the liquid is a regeneration agent for the respective cellulose solution known in the art. The regeneration agent may be, e.g., a diluted aqueous NMMO solution to form a solution of the cellulose in aqueous NMMO. To form a solution of cellulose in an ionic liquid, any medium suitable for the ionic liquid being used is suitable.

2) As an alternative the cooling down can take place without any direct contact with a liquid. In this respect the solution is for example poured through a correspondingly large opening into a mould. The mass is then allowed to solidify slowly at a temperature below the temperature of the solution, for example at room temperature.

Depending on how the solution is cooled down, the further preparation of the powder in accordance with the invention may differ.

According to process variant 1, the cooled down and in part already washed out cellulose solution is then coarsely pre-broken down (granulator, shredder or something similar) to form granules. The granules should have a size of approx. 1-2 mm following this step. For this process step a commercially available underwater pelletizer is well suited which is, for example, available from the manufacturers Kreyenborg and Rieter. In one embodiment, the cooling liquid used for cooling the solution can be used as the operating liquid.

The granules are washed out at a higher temperature in water so that the solvent is removed. In this respect the granules are for example placed in a container with water and heated to 70° C. for a certain time while stirring. The water charged with solvent is separated from the granules by centrifugation. If necessary this cycle can be repeated several times until the solvent content lies below the value desired. For smaller amounts of granules it makes sense to free the granules of solvent under flowing water.

Finally, the granules are ground (or further ground). Depending on the fineness desired, various grinding processes are required for this. For most mill types the granules are preferably also dried, which can be accomplished, for example, using a belt drier. For grinding, any suitable mill types can be used because the grinding success depends on the desired characteristics and design of the mill. The grinding does not depend entirely on the grinding principle applied, which can vary. Suitable mills include cutting, gap, jet and baffle mills.

The following describes the mill systems which may be used in accordance with the invention.

Long Gap Mill:

The advantage of this mill type (e.g., UltraRotor from Jäckering) is that moist granules can be ground and dried at the same time. The inclusion of an attached visual inspection allows for a powder with a fineness of lower than 30 µm to be obtained.

Flow Bed Counter-jet Mill:

With this type of mill (e.g., from Hosokawa Alpine) particles smaller than 10 µm can be produced. However, the granules cannot be directly processed but rather must be pre-disintegrated using a simpler mechanical mill. Jet mills are very cost and energy intensive but they produce very good powder due to an integrated classifier. In addition, spiral jet mills are suitable. Nitrogen or air can be used as the gas.

Baffle Mill:

In these simple mechanical mills the disintegration effect depends greatly on the milling tool used. Powders with a fineness of smaller than 150 µm are possible which can be used as a starting point for grinding in a jet mill. Likewise a separation of the fine share is possible using the classification.

Cryo Grinding

To improve the grinding result, some mills can also be cooled with liquid nitrogen. The ground stock is also embrittled with liquid nitrogen.

According to process variant 2, the solidified spinning mass is likewise mechanically disintegrated prior to the actual milling, for example using a shredder, a granulator or similar devices, whereby attention is to be paid to corresponding cooling to prevent the further melting of the solution. After this the fine grinding of the mass is performed whereby the mill types described above can be used to obtain a powder. In this step care should again be taken that the melt temperature of the solution is not exceeded. In this embodiment the cryo grinding described above is suitable to prevent the spinning mass from melting.

In one embodiment, the powder obtained in accordance with the invention is regenerated at a higher temperature in water and then dried. A drying belt is suitable for coarser powders and with finer powders more complex drying such as fluidized bed drying or spray drying is necessary.

Likewise a preceding exchange of solvent e.g., for acetone or ethanol with a concluding drying from this solvent is possible.

After drying, a second disintegration in a second mill can take place in both exemplary process variants. In particular the above named mill types are suitable for this second grinding.

In the process in accordance with the invention additives can be mixed into the cellulose solution selected from the group consisting of pigments, inorganic substances, such as, for example, titanium oxide, preferably substoichiometric titanium oxide, barium sulphate, ion exchangers, polyethylene, polypropylene, polyester, soot, zeolites, activated carbon, polymer superabsorbers and flame protection agents which are preferably retained in cellulose particles of the powder of the invention. This can be added anywhere in solution production and in any case before solidification. 1 to 200 weight percentage additives can be mixed in, in relation to the cellulose amount. Surprisingly it has been seen that these additives are not removed during washing but rather remain in the cellulose particles and also largely maintain their function.

Thus, one can, for example, see when mixing in activated carbon that the active surface, which is for example measurable using, e.g., the BET method, remains relatively intact in the finished particle in accordance with the invention. Not only the additives located on the surface of the cellulose particle but also those in the inside thus remain completely accessible. This is very surprising since one would actually expect that the surface of the additive would be completely covered by the cellulose solution and is thus no longer accessible later. This is particularly useful from an economic point of view because only low amounts of additives are necessary.

The invention is also directed to a cellulose powder consisting of particles which are produced according to the processes described above.

In one embodiment of the invention, cellulose powder comprises particles having a cellulose-II-structure with a particle size in the range of from about 1 μm to about 400 μm, an average particle size $x_{50}$ between from about 4 μm and about 250 μm and optionally a monomodal particle size distribution. The particles preferably comprise an approximately spherical particle form with an irregular surface, a crystallinity in the range of from about 15% to about 45% according to the Raman method, a specific surface ($N_2$ adsorption, BET) between from about 0.2 m$^2$/g and about 8 m$^2$/g and a bulk density between from about 250 g/l and about 750 g/l.

The cellulose-II structure is the result of dissolving and re-precipitating the cellulose and differentiates the present particles in particular from those of cellulose without a dissolution step.

The particle size in the range of from about 1 μm to about 400 μm with a particle distribution which is characterized by an $x_{50}$ value between from about 4 μm and about 250 μm is naturally influenced by the operating mode in grinding. As a result of the special mode of production via the solidification of a free flowing cellulose solution and the mechanical properties of the solidified cellulose mass caused by this, this particle distribution can, however, be easily reached. A cellulose solution which solidifies under shear stress would reveal other, and in particular fibrillar, properties, in the same disintegration conditions. Just as surprising is the monomodal particle size distribution which results, in particular without considerable shares of smaller or larger particles. Comparable cellulose powders made according to processes which are state of the art have larger particles due to their fibrillar structure. It is believed that these arise as a result of smaller fibrillar particles getting stuck or otherwise joining up. Moreover they have a considerable share of smaller particles which result when individual fibrils break off.

The shape of the particles in accordance with the invention is approximately spherical with an axial ratio (1:d) of between 1 and 2.5. They have an irregular surface and under the microscope they reveal little to no fiber-like fringes or fibrils. Thus, the particles these are by no means balls with a particularly smooth surface. A form of this kind would not be preferred for the applications intended.

The comparatively low crystallinity in the range of from about 15% to about 45%, and more preferably from about 15% to about 35%, measured using the Raman method, is obtained by the method in accordance with the invention. A cellulose solution which is exposed to a shear force at or directly before solidifying produces particles with a higher crystallinity.

The specific surface, measured by means of $N_2$ adsorption according to the BET process equals between from about 0.2 m$^2$/g and about 8 m$^2$/g for the cellulose powder in accordance with the invention provided that no additives are contained. The specific surface is influenced among other things by the type of disintegration used and the particle size. As a result of additives the specific surface can be considerably increased as the examples described below show.

The apparent density of the cellulose powder in accordance with the invention, which is between from about 250 g/l and about 750 g/l is higher than the comparable, fibrillar particles from the state of the art. This has considerable advantages in terms of process engineering since this also expresses the compactness of the cellulose powder in accordance with the invention and thus among other things a better pourability, ability to be mixed into various media and a less problematic storage capability.

It was possible to produce particles with this combination of properties for the first time with the process described here. In particular it was surprising that this process can produce particles particularly well suited to the applications described here due to a cellulose solution flowing freely before its solidification.

The particles obtained demonstrate enhanced pourability due to their spherical structure and comprise minimal shear thinning behavior. The characterization of the particles using the particle sizing devices widely used in industry is also easier due to the spherical design. It is believed that the not completely smooth and irregular surface structure leads to a higher specific surface which contributes to the higher and excellent adsorption behavior of the powders.

A cellulose powder of this kind in accordance with the invention can also include cellulose particles which also comprise from about 1 to about 200 weight percentage, in relation to the cellulose quantity, of incorporated additives selected from the group consisting of pigments, inorganic substances such as for example titanium oxide, in particular substoichiometric titanium oxide, barium sulphate, ion exchangers, polyethylene, polypropylene, polyester, activated carbon, polymer superabsorbers and flame protection agents.

In the following preferred embodiments of the invention are described on the basis of examples. The invention is, however, not only restricted to these embodiments but rather encompasses all the other embodiments which are based on the same inventive concept.

The determination of the particle size was performed with a laser diffraction measuring device. The $x_{50}$ and $x_{99}$ values were calculated using the evaluation program installed.

The crystallinity determination of cellulose using the Raman method was performed as in Roder, T., et al, Crystallinity determination of man-made cellulose fibers—comparison of analytical methods. Lenzinger Berichte, 2006. 86: p. 132-136.

The BET surface and the apparent densities were determined with commercially available measuring equipment.

EXAMPLE 1

Lyocell spinning mass with a cellulose content of 11.5% was led through a pipe with a diameter of 30 mm with a low flowing speed into a water tank. The throughput through the pipe thereby equaled around 400-500 g of spinning mass per minute. In this respect the mass solidified and regenerated in part. The cooled down mass was disintegrated with a granulator to a size of ~1 mm. The remaining NMMO was washed out under flowing water to a content of less than 0.05%. The granules were dried in a drying cabinet at 60° C.

Figure 3:
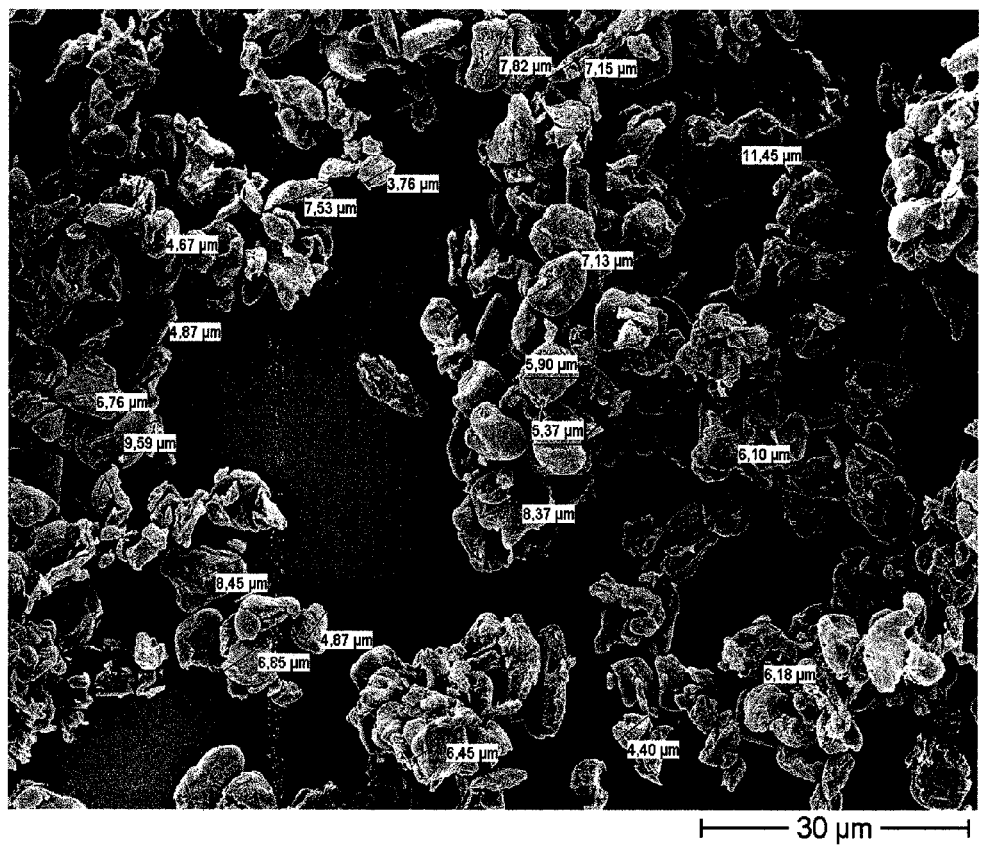
FIG. 3 shows an enlarged image of exemplary cellulose particles from the cellulose powders in accordance with the present invention.

The dried granules were then ground in a baffle mill to a fineness of 100-200 μm. In this respect the granules passed through the mill only once. Fine grinding took place with a counter-jet mill (Hosokawa AEG 100) with an integrated classifier. The particles obtained in this way (see FIG. 3 for the form and size of the individual particles) reveal the following properties:

Particle size (laser diffraction) $x_{50}$=4.8 μm & $x_{99}$=15.0 μm;
Crystallinity (Raman) Xc=29%;
BET surface ($N_2$ adsorption) $a_{S, BET}$=4.9 $m^2$/g;
Bulk density 304 g/l.

EXAMPLE 2

Granules washed free of NMMO, produced as in example 1, with a dry content of ~20% were not dried but rather directly ground via a long gap mill (type Ultra Rotor from Jäckering). In this mill type the product is dried at the same time as grinding. In this respect a fineness of $x_{50}$=22.8 μm & $x_{99}$=143 μm was attained. With an upstream classification the following properties resulted for the particles:

Particle size (laser diffraction) $x_{50}$=8.3 μm & $x_{99}$=52 μm;
Crystallinity (Raman) Xc=24%;
BET surface ($N_2$ adsoprtion) $a_{S BET}$=1.8 $m^2$/g;
Bulk density 380 g/l.

EXAMPLE 3

Lyocell spinning mass with a cellulose content of 5% was poured into a mould to a slab approximately 1 cm thick which solidified at room temperature. Finally the slab was mechanically broken down with a hammer and these granules were then ground with a cutting mill Retsch SM2000. In the cutting mill a relatively coarse sieve was used with a Conidur perforation of 1 mm mesh aperture and 250 g of ground stock which had previously been cooled in a freezer at −8° C. was added slowly by hand to avoid the melting of the granules. The powder obtained was placed in an excess of water for regeneration and stirred. As a result of filtering, the solvent-water mixture was separated from the powder. This procedure was repeated 10 times until the NMMO content in the washing water had decreased to below 0.05%. The powder was dried by exchanging the solvent of the water with acetone (five times change) and finally carefully evaporating the solvent while stirring constantly. As a result of this process, particles were produced with the following properties:

Particle size (laser diffraction) $x_{50}$=163 μm;
Crysallinity (Raman) Xc=31%;
BET surface ($N_2$ adsorption) $a_{S, BET}$=0.25 $m^2$/g;
Bulk density 652 g/l.

EXAMPLE 4

100 weight percentage (in relation to cellulose) of activated carbon powder were mixed into a Lyocell spinning mass with a cellulose content of 10% with a BET surface of $a_{S, BET}$=58.7 $m^2$/g. The mass obtained was filled in a PVC pipe with a diameter of 30 mm and left to solidify there at room temperature. Finally the cylinder obtained was pre-disintegrated mechanically using a saw and hammer and the fractions obtained with a particle size in the mm range were placed in a container with an excess of water to remove the solvent and stirred. As a result of filtering the solvent-water mixture was separated from the granules. This procedure was repeated ten times until the NMMO content in the washing water had dropped below 0.05%. The coarse powder was dried in the drying cabinet at 60° C.

The further grinding was performed with a small laboratory cutting mill whereby first a 40 mesh sieve was used and then in a second grinding step an 80 mesh sieve. As a result of this process, particles were produced with the following properties:

Particle size (laser diffraction) $x_{50}$=230 μm
BET surface (N2 adsoprtion) $a_{S, BET}$=28.3 $m^2$/g The high value for the BET surface in comparison to the particles free of activated carbon from the previous examples can be attributed to the activated carbon used. It can be seen quite clearly that pores of activated carbon are not blocked with cellulose during particle production and are also practically completely accessible in the cellulose powder.

What is claimed is:

1. A process for the production of approximately spherical, non-fibrillar cellulose particles having an irregular surface with a particle size in the range of from about 1 μm to about 400 μm comprising, forming a solution of non-derivatized cellulose in a blend of an organic substance and water, directly cooling down the cellulose solution to below its solidification temperature wherein the solution is free flowing, washing out the solvent, disintegrating the solidified cellulose solution, and drying the disintegrated and washed out particles.

2. The process according to claim 1, wherein the disintegrating is performed by means of a mill.

3. The process according to claim 1, wherein the cooling down further comprises contact with a liquid.

4. The process according to claim 3, wherein the liquid is a regeneration medium.

5. The process according to claim 1, wherein the cooling down does not require contact with a liquid.

6. The process according to claim 1, wherein the drying comprises exchange of solvents.

7. The process according to claim 1, further comprising a second disintegrating step after the drying step, wherein the second disintegrating comprises a mill.

8. The process according to claim 2 or 7, wherein the mill is selected from the group consisting of a cutting, gap, jet or baffle mill.

9. The process according to claim 1, further comprising adding to cellulose solution from about 1 to about 200 weight percentage of additives, in relation to the cellulose amount, selected from the group consisting of pigments, titanium oxide, substoichiometric titanium oxide, barium sulphate, ion exchangers, polyethylene, polypropylene, polyester, activated carbon, polymer superabsorbers and flame protection agents.

10. The process according to claim 1, wherein the organic substance is an amine oxide, preferably N-methyl morpholine N-oxide.

11. A cellulose powder consisting of approximately spherical, non-fibrillar cellulose particles having an irregular surface with a particle size in the range of from about 1 μm to about 400 μm obtained from a solution of non-derivatized cellulose in a blend of an organic substance and water produced according to a process comprising forming the solution of non-derivatized cellulose, directly cooling down the cellulose solution to below its solidification temperature wherein the cellulose solution is free flowing, washing out the solvent, disintegrating the solidified cellulose solution, and drying the disintegrated and washed out particles.

12. A cellulose powder comprising non-fibrillar cellulose particles having a cellulose-II-structure wherein the particles have a particle size in the range of from about 1 μm to about 400 μm and an average particle size $x_{50}$ between from about 4 μm and about 250 μm, wherein the particles comprise:

An approximately spherical particle form with an ratio of between 1 and 2.5, and an irregular surface;

A crystallinity in the range of from about 15% to about 45% in accordance with the Raman method;

A specific surface, measured by mean of $N_2$ adsorption according to the BET process, of between from about 0.2 $m^2/g$ and about 8 $m^2/g$; and A powder density of between from about 250 g/l and about 750 g/l, wherein the cellulose power is obtained from a solution of non-derivatized cellulose in a blend of an organic substance and water produced according to a process comprising forming the solution of non-derivatized cellulose, directly cooling down the cellulose solution to below its solidification temperature wherein the cellulose solution is free flowing, washing out the solvent, disintegrating the solidified cellulose solution, and drying the disintegrated and washed out particles.

13. The cellulose powder in accordance with claim 12, further comprising a monomodal particle size distribution.

14. The cellulose powder according claim 11, 12, or 13, further comprising from about 1 to about 200 weight percentage, in relation to the cellulose amount, incorporated additives selected from the group consisting of pigments, titanium oxide, substoichiometric titanium oxide, barium sulphate, ion exchangers, polyethylene, polypropylene, polyester, activated carbon, polymer superabsorbers and flame protection agents.

* * * * *